United States Patent [19]

Malek

[11] 4,138,527

[45] Feb. 6, 1979

[54] SHEET OR WEB TYPE MATERIALS WITH A MARKABLE ADHESIVE-REPELLENT COATING, AND A PROCESS FOR THEIR MANUFACTURE

[75] Inventor: Wasfi N. Malek, Hamburg, Fed. Rep. of Germany

[73] Assignee: Beiersdorf Aktiengesellschaft, Hamburg, Fed. Rep. of Germany

[21] Appl. No.: 807,720

[22] Filed: Jun. 17, 1977

[30] Foreign Application Priority Data

Jul. 1, 1976 [DE] Fed. Rep. of Germany ....... 2629535

[51] Int. Cl.$^2$ .......................... B32B 27/40; B05B 5/04
[52] U.S. Cl. ......................................... 428/425; 106/2; 260/32.8 N; 260/37 N; 260/33.6 UB; 427/177; 427/208; 427/211; 428/40; 428/354; 428/352; 428/355; 428/906; 528/59; 528/288
[58] Field of Search ............... 428/352, 425, 354, 906, 428/355, 423, 40; 427/177, 211, 208, 385 B; 106/2, 287 S; 260/77.5 A, 77.5 AN, 77.5 AM, 32.8 N, 33.64 B, 37 N; 528/59, 288

[56] References Cited

U.S. PATENT DOCUMENTS

| | | | |
|---|---|---|---|
| 3,341,488 | 9/1967 | O'Connor | 260/77.5 A |
| 3,441,523 | 4/1969 | Dwyer et al. | 260/37 N |
| 3,470,121 | 9/1969 | Cobbledick | 260/37 N |
| 3,668,173 | 6/1972 | Wooster et al. | 260/77.5 AM |
| 3,851,761 | 12/1974 | Schwarcz | 428/906 |
| 4,056,661 | 11/1977 | Sato et al. | 428/352 |

FOREIGN PATENT DOCUMENTS

| | | | |
|---|---|---|---|
| 244432 | 1/1961 | Australia | 427/208 |
| 667331 | 7/1963 | Canada | 428/354 |

*Primary Examiner*—William A. Powell
*Assistant Examiner*—J. J. Gallagher
*Attorney, Agent, or Firm*—Bierman & Bierman

[57] ABSTRACT

Self-adhesive webs or sheets are disclosed which are easily marked by ordinary printing means. They are prepared by coating a flexible substrate with a reactive mixture of a polyurethane, an aliphatic trifunctional isocyanate having terminal isocyanate groups, glycerin, microfine siliceous matting agents, and an organic tin ester catalyst. A process for their manufacture is also disclosed.

20 Claims, No Drawings

SHEET OR WEB TYPE MATERIALS WITH A MARKABLE ADHESIVE-REPELLENT COATING, AND A PROCESS FOR THEIR MANUFACTURE

The present invention relates to a process for the manufacture of sheet or web type materials which have a markable adhesive-repellent coating on at least one side and to markable materials coated to be adhesive-repellent. An adhesive-repellent layer is considered "markable" if it can be lettered, painted or printed on. The present adhesive-repellent layer can be marked using ordinary writing and painting pens, such as, felt, fiber, and ball point pens. These pens can utilize a wide variety of solvent-containing and aqueous inks in addition to India inks and colored inks.

Adhesive-repellent coatings are applied in a thin layer on various support materials (separating foil, separating paper) and used for the temporary covering of the adhesive layers of self-adhesive labels and also as reinforcing bases for self-adhesive fabrics or foils. Additionally, they are also applied on the back of self-adhesive tapes, so that they may be wound in a roll. Adhesive-repellent coatings are principally used when a covering must be easily removed from a self-adhesive layer or when uncovered adhesive tapes must be easily unwound from a roll. The present adhesive-repellent coatings are effective even after prolonged storage under unfavorable conditions.

It is known that self-adhesive strips can be made markable by mechanically or chemically roughening the adhesive-free surface of a support foil, or by coating it with a lacquer containing a high proportion of fine grain solids. Adhesive tapes produced using these roughening methods must generally be rolled with covering foils or separating papers as a result of the increased adhesiveness at the roughened or matted surfaces.

This difficulty can usually be eliminated by roughening the back of a smooth support foil which does not have a self-adhesive layer. The roughening process can be accomplished by the use of a chemical or mechanical means or by matting with a lacquer containing fillers. A thin layer of an ordinary adhesive repellent agent is then applied to the roughened or matted side. A polysiloxane-containing or high molecular weight compound with long-chain side groups maybe used for this purpose. While the layer must be thin enough to leave an exposed matted surface for marking, it must also be thick enough to produce a satisfactory adhesive-repellent effect. This process is burdensome since it requires two successive operations which must be well matched in order to obtain the desired thickness. In industrial manufacture such requirements are sometimes difficult to achieve.

Another well known adhesive-repellent coating consists of a hot-sealing adhesive containing an amide wax, such as polyamine-amide resin. The addition of a matting agent to this wax results in a coating with repelling properties that allows marking. This type of coating is undesirable because it adheres too firmly to the highly self-adhesive compositions that are generally preferred. In addition, because it lacks chemical curing or hardening, this coating mixture is too pliable for the high compression load associated with ordinary writing utensils. The coating is markable only to a limited extent with solvent-containing inks, India inks or color pastes because the color (ink) and the partially dissolved coating may become admixed.

Complex polyester and polyurethane polymer systems have been proposed as adhesive-repellent coatings. These include polyvinyl fatty acid esters, polyacrylate copolymers and polyurethanes such as the reaction products of glycerin monostearate with poly-isocyanates or polyvinyl carbamates. These polymers always contain components having long-chain alkyl groups which cause a strong adhesive-repellent effect. Additionally, these polymers result in the production of a hydrophobic surface due to their high molecular weight non-polar component. These adhesive-repellent coatings, when applied as a uniform layer on smooth film or foil type supports, have a pronounced separating effect on a plurality of substances. As a result, these surfaces cannot be effectively written upon with the usual writing materials such as pencils, ballpoint pens, and India and other inks.

French Pat. No. 1,267,505 discloses a polyurethane-containing adhesive-repellent coating which can only be sufficiently anchored on paper supports and has a separating effect only on conventional self-adhesive compositions of the rubber-resin type. It is obtained by the reaction of alkyl resins with aromatic trifunctional isocyanate, (the reaction product of aromatic diisocyanates and hexanetriol). The limited use of this coating is extremely disadvantageous. Furthermore, this reference fails to disclose the addition of a matting agent or the markability of the coating. However, properties such as flexibility and pliability are mentioned as advantages of this coating. These properties conflict with the requirements of a markable surface.

In summary, known adhesive-repellent coatings with organic polymer systems or polysiloxanes are disadvantageous because it is difficult to adjust the degree of adhesive repulsion. Thus, even with the addition of a matting agent, they have highly pronounced separating properties and therefore they can only be marked in a special manner. The thus coated rolls of adhesive strips tend to fall apart because of an excessive adhesive-repellent effect. This is especially apparent when the rolls are subjected to the tensile forces associated with rapid mechanical pull-off. If the adhesive-repellent effect of the matting agent-containing layer is decreased in order to increase it markability, it becomes difficult to pull the adhesive tape off a roll. Moreover, if the adhesive composition has a very high adhesion force, the adhesive layer may even transfer to the back of the support.

It is the object of the present invention to avoid the aforementioned disadvantages and to provide a firm, markable and printable, solvent-stable adhesive-repellent coating which properly anchors to a flexible sheet or a web type support material. These support materials include smooth plastic foils, as, for example, polyvinyl chloride foils. Additionally, the coating exhibits an excellent separating effect with all self-adhesive compositions, especially high adhesive compositions of the polyacrylate and rubber-resin type. The coating must be hydrophilic and absorbent in the presence of the incorporated matting agent and abrasive, so that it can be satisfactorily marked by lettering and printing with all ordinary writing materials, including polar liquids such as aqueous inks and India inks. In particular, the process according to the present method produces a markable self-adhesive tape which can be wound in a roll and stored and can be then unwound for use without difficulty. The initial adhesiveness and the adjusted separating effect can be preserved after prolonged storage under unfavorable conditions even if plastics containing a high proportion of plasticizer as, for example, soft polyvinyl chloride, serve as support foils.

A further object of the present invention is to provide a process for the manufacture of sheet or web type materials, in particular, self-adhesive materials, with an adhesive-repellent coating. The present method can be carried out simply and rapidly in a continuous operation. This requires that the separating effect and markability be largely independent of the application thickness of the adhesive-repellent coating composition and that the final drying and hardening steps be carried out quickly at low temperatures.

The process according to the present invention, and the products manufactured by it, are characterized by adding to a solvent system a mixture consisting essentially of:

44 to 84 parts by weight of (a) a non-reactive, organic solvent soluble, linear polyurethane resin or (b) a polyurethane resin containing hydroxypolyester groups, 1 to 16 parts by weight of an aliphatic trifunctional isocyanate with terminal isocyanate groups, 1 to 14 parts by weight of glycerin 0 to 40 parts by weight of a micro-fine siliceous matting agent, 0 to 1 part by weight of an organic tin ester catalyst.

100 parts by weight of the above-solvent containing mixture is applied on a support in a thin layer, dried, and the mixture is thereafter reacted by a brief heat treatment. The mixture may optionally contain small quantities of the usual additive and fillers.

According to the present invention, polyurethane resins, such as, aliphatic and aromatic polyurethanes with a chain type structure and largely saturated alcohol and isocyanate groups can be used. The degree of polymerization of the resins should allow them to be very soluble in lower alcohols, such as isopropanol. Such polyurethane resins are commonly found as lacquer raw materials.

Other polyurethane resins operable in the present process are those copolymer adhesive components that contain hydroxy-polyester groups and also possess a largely chain-type molecular structure.

The hydroxy group content of the resins should be low, preferably about 0.1%, so that they can be reacted with isocyanates. These products are very soluble in esters and ketones due to a mean molecular weight of 150,000 to 200,000 and, hence, are suitable for use in the present invention.

Any isocyanate containing terminal isocyanate groups can be used as an aliphatic triisocyanate. Most preferred are those with an isocyanate content of 16-17%. An advantageous isocyanate can be prepared by reacting two moles of diisocyanate with a corresponding urea, and further reacting another mole of diisocyanate with the mixture to form the biuret of hexamethylene diisocyanate.

The solvent stability, the cohesiveness and the anchoring of the matted adhesive-repellent coating on the support are affected by the isocyanate content of the coating mixture. The detaching properties of the coating depend on the amount of matting agent and glycerin present. The effectiveness of the coating can be matched in a simple manner with the adhesiveness of the self-gluing composition by varying the quantity of glycerin used. This procedure is also advantageous when a support has an adhesive-repellent coating on both sides and both surfaces are to have different detaching properties.

The matting agent used according to the present invention consists of fine-grain siliceous compounds, such as, highly dispersed silicon dioxide or micro-fine aluminum and magnesium silicate, whose particle size is advantageously in the range of 0.1 to 15 microns. Also, hydrophobiciseol colloidal silicic acids with methylated silanol groups on the surface and particle sizes of up to $30\mu$ are suitable.

A mixture of equal proportions of silicon dioxide and magnesium silicate is preferably used. Such a mixture is easily dispersed in a solution of the polymers and is an excellent absorbant for thin inks and India inks and, in addition, is highly abrasive to lead pencils, color pencils and similar writing utensils due to its coarse-grain components. A similarly preferred matting agent consists of approximately equal parts of highly dispersed silicon dioxide and talc having a particle size 0.1-15 microns. If the adhesive-repellent coating is used without the addition of a matting agent, it is still satisfactorily markable with aqueous inks, India inks and color pastes. Due to its marked hydrophilic properties, the liquid film does not divide nor contract to form drops because of its surface tension.

Suitable catalysts for the final hardening reaction are organometallic compounds such as dibutyl tin diacetate or dibutyl tin dilaurate.

Light protection agents, age resisters, metal powders, pigments or fillers may be admixed as additives.

The solvent system used to apply the mixture may contain easily removable solvents which can evaporate at low temperatures. These solvents include esters, such as methyl, ethyl, and butyl acetate; ketones, such as acetone and butanone; aromatics, such as toluene or xylene; and alcohols, such as isopropanol. If, according to the present invention, a polyurethane containing polyester group is employed, then, preferably, alcohol-free solvents (e.g. esters, ketones and aromatics) may be used. When a polyurethane resin is used, a predominantly isopropanol-containing solvent mixture with a high proportion of aromatics and a low proportion of esters is advantageous. The presence of isopropanol results in the isocyanate-containing formulations having extensive processing times.

Adhesive-repellent coatings can generally be produced as follows:

Polyurethane resin, glycerin, talc, silicon dioxide, isocyanate, a catalyst and, if desired, additives are successively added to one of the above stated solvent mixtures, with intensive agitation, so that a 1–20% solution or stable dispersion is formed. The resulting mixture is then applied with one of the usual coating systems, e.g. a roll applicator, in a thin layer directly on a smooth support foil that has not been pretreated. The coated material is then passed through a drying channel. A residence time of 0.1 to 1.0 minute, preferably 15 seconds, at 60 - 90° C., preferably 80 - 90° C. is sufficient to remove the easily volatile solvents and to carry out the hardening reaction. An application thickness of 0.5 - 3.5g/m$^2$ should be obtained after drying. Recuring is not necessary.

Although the mechanism of the hardening reaction is not fully understood, it may be assumed that, in addition to urethane formation which is primarily expected, secondary reactions may also occur between the formed products and the starting compounds. Urethane formation may occur between the isocyanate groups and the reactive hydrogen atoms of the glycerin hydroxy groups, and possibly the hydroxy groups of the polyester-containing polyurethane. Also the inclusion of reaction products formed as a result of side reactions with water or solvent residues forms a complex, elastic, cross-linked, polymeric reaction product. Firmly embedded in these products are components of the solvent-mixture that are not chemically bonded.

The insensitivity of the present process to atmospheric moisture and impurities in the reaction components is an advantage which allows mass production of the resultant products.

The support web with an adhesive-repellent coating on one side can immediately be coated on the other side with the usual self-adhesive compositions, such as rubber-resins, or preferably acrylates, and wound in a roll. As a result of the strong adhesive-repellent effect, even wide webs of a pliably elastic support can be unwound effortlessly and used in a tape cutting device.

A large variety of suitable support material is available. Common foils made of plastics, modified natural materials, metals, papers, fabrics and fiber mats on which the adhesive-repellent coating of the present invention generally adheres without difficulty may be used as sheet or web type support material. In particular, smooth hard and soft polyvinyl chloride foils, that have not been chemically pretreated, polyethylene and polypropylene foils, polyester foils (polyterephthalate foils) and smooth aluminum foils have all proved to be suitable.

The present process provides a simple manner for the production of properly markable adhesive-repellent coatings that incorporate matting agents whose detaching properties can be controlled by the composition of the mixture, rather than by the application thickness. Upon prolonged storage under unfavorable temperatures these separation properties remain constant, since the individual coating constituents do not segregate. The resulting coating is insensitive to the components such as plasticizers of the self-adhesive compositions and of support foils. As a result, the adhesiveness is preserved between the self-adhesive layer and the adhesive-repellent coating even for long contact times.

The coating adheres well on practically all common substrates. It will adhere to smooth foil surfaces, without the need to chemically or mechanically roughen them. It is also elastic enough to firmly adhere on flexible and stretchable foils. For these reasons it can also be used as a prime coat before additional applications, as in lacquer applications.

The adhesive-repellent coating of the present invention has hydrophilic properties and, due to the incorporated matting agent particles, it is so absorbent that it can be satisfactorily marked with high water-content inks and India inks. It can also be marked with predominantly solvent-containing colors (inks) and India inks. Additionally, it can also be satisfactorily written upon with hard writing utensils such as ballpoint pens and lead pencils, because of its cohesion and the firmly embedded abrasive.

The present coating can be used for self-adhering markable adhesive tapes or labels in sheet or roll form without intermediate layers of separating paper and also for markable or printable separating foils.

The markable adhesive strips can also be used advantageously as packing tapes and drawing foils.

The present invention will be further illustrated in greater detail by the following examples.

EXAMPLE 1

The following components were incorporated in the stated weight proportions using a rapid agitator in a solvent mixture consisting of 50% isopropanol, 30% toluene and 20% acetic acid ethyl ester:

59 parts by wt. of a linear polyurethane resin ("Desmolac 4125", Bayer AG)

4 parts by wt. of triisocyanate ("Desmodure N", Bayer AG)

7 parts by wt. of glycerin 30 parts by wt. of a matting agent mixture consisting of equal parts of silicon dioxide ("Matting Agent TK 900", Degussa) and microtalc.

The resulting mixture of the coating agent in the solvent mixture formed a suspension having solid content of 8%. The mixture was coated using a roll applicator in a layer thickness of 2.5 g/m$^2$ (dry weight) on one of the untreated, smooth surfaces of a transparent foil made of hard PVC with a thickness of 50 microns.

The material treated with the reaction mixture was then heated for about 20 seconds to about 80° C. in the drying channel of a coating unit suitable for large-area support materials, for the purpose of drying and reacting the coating.

A solution of a self-adhesive composition containing a sucrose-acetate-isobutyrate plasticizer, consisting of a butylacrylateacrylic acid copolymer was coated in a layer thickness of 25 g/m$^2$ on the non coated surface of the support material and dried at 80° C.

An excellently markable, transparent self-adhesive material with an adhesive-repellent backing was obtained. The roll-off force was only about one third of the force determined for the untreated back. The markable self-adhesive foil thus obtained can either be cut into strips immediately and wound on cores into rolls ready for sale or it can be wound uncut and later divided into the desired widths.

The adhesive strip rolls thus produced retain their easy unrolling capacity even after long storage, without losing any of their other desirable properties. The rolled-off adhesive strips are easily marked with lead pencil, ball point pen, ink, drawing India ink, India ink with a high water-content and type-writer ribbon. The writing could not be effaced after the lettering had dried on the support.

EXAMPLE 2

On a smooth, soft PVC foil 70 microns thick, a reactive mixture was applied in a thickness of 1.3 g/m$^2$ in the same manner as described in Example 1, and reacted at 75° C. The mixture consisted of a 20% acetic acid ethyl ester solution and contained the following components:

80 parts by wt. of a polyurethane resin containing hydroxypolyester groups. ("Desmocoll 400", Bayer AG)

11 parts by wt. of triisocyanate ("Desmodur N", Bayer AG)

4 parts by wt. of glycerin 0.8 part by wt. of dibutyl tin dilaurate 4 parts by wt. of hydrophobized silicon diozide ("Aerosil R 972", Degussa).

Additional process steps were carried out as described in Example 1. The markability of the adhesive strips obtained was satisfactory.

EXAMPLE 3

On a smooth, biaxially stretched polypropylene foil, 25 microns thick, a reactive mixture was applied in a thickness of 0.8 g/m² in the same manner as described in Example 1, and reacted at 70° C. The mixture consisted of a 5% solution (suspension) in butanone and isopropanol in equal parts of the following components:

60 parts by wt. of a polyurethane resin ("Desmolac 4125", Bayer AG)
5 parts by wt. of triisocyanate ("Desmodur N", Bayer AG)
5 parts by wt. of glycerin
30 parts by wt. of talc.
0.2 part by wt. of dibutyl tin diacetate.

A curable ethylhexylacrylate-n-butylacrylate copolymer was used as the self-adhesive composition. A rolled-up adhesive tape proved to be age-resistant and was easily marked with the aforementioned writing means.

EXAMPLE 4

A modified paper (parchment paper) was used as support for a separating intermediate layer with an adhesive-repellent coating on both sides. It was 0.6 mm thick and each side was coated with either a 15% solution A or with 15% solution B. Each solution contained acetic acid, ethyl ester and butanone in equal parts. The solutions were applied in a thickness of 3.5 g/m² and reacted at 80° C.

Solution A 49 parts by wt. of a polyurethane resin ("Desmocoll 400", Bayer AG)
8 parts by wt. of triisocyanate ("Desmodur N", Bayer AG)
7 parts by wt. of glycerin
35 parts by wt. of silicon dioxide ("Matting Agent TK 900", Degussa)
0.5 part by wt. of dibutyl tin dilaurate

Solution B 70 parts by wt. of a polyurethane resin ("Desmocoll 400", Bayer AG)
16 parts by wt. of triisocyanate ("Desmodur N", Bayer AG)
13 parts by wt. of glycerin
0.5 part by wt. of dibutyl tin dilaurate.

The detaching properties of the two sides of the markable separating paper thus produced were clearly different. On the side with the lesser adhesive-repellent effect, a self-adhesive layer on a polyacrylate base was then applied. It had a layer thickness of 25 g/m² after drying at 70° C. The finished adhesive strip was wound as a roll with the adhesive composition layer directed inward.

This type of adhesive strip which uses the transfer of a pressure-sensitive, self-adhesive layer on various substrates offers marking possibilities on the covered side.

What we claim is:

1. A self-adhesive web or sheet material, which comprises a flexible substrate coated on at least one side with a markable adhesive-repellent coating said coating having been produced by heating a solvent-containing mixture consisting essentially of an organic solvent, 44 to 84 parts wt. of (a) a non-reactive, organic solvent-soluble, linear polyurethane resin or (b) a polyurethane resin containing hydroxypolyester groups, having a hydroxyl content of about 0.1%,
1 to 16 parts by wt. of an aliphatic trifunctional isocyanate containing terminal isocyanate groups,
1 to 14 parts by wt. of glycerin,
0 to 40 parts by wt. of a micro-fine siliceous matting agent,
0 to 1 part by wt. of an organic tin ester catalyst.

2. Sheet or web type materials according to claim 1 wherein the polyurethane resin containing hydroxypolyester group has a mean molecular weight of 150,000 to 200,000.

3. Sheet or web type materials according to claim 1 wherein the trifunctional isocyanate is biuret of hexamethylene diisocyanate.

4. Sheet or web type materials according to claim 1 wherein the aliphatic trifunctional isocyanate has an isocyanate content of about 17%.

5. Sheet or web type materials according to claim 1 wherein the matting agent consists of approximately equal parts of highly dispersed silicon dioxide and talc having a particle size of 0.1-15 microns.

6. Sheet or web type materials according to claim 1 wherein the matting agent consists of equal parts of silicon dioxide and magnesium silicate.

7. Sheet or web type materials according to claim 1 wherein polyvinyl chloride is used as support.

8. Sheet or web type self-adhesive materials according to claim 1 wherein the self-adhesive materials are coated with strongly adhesive acrylate adhesive compositions.

9. Sheet or web type self-adhesive materials according to claim 1 wherein the organic solvent is at least one compound selected from the group consisting of esters, ketones, aromatics and alcohols.

10. A process for the manufacture of sheet or web type self-adhesive materials coated on at least one side of a flexible substrate with a markable adhesive-repellent coating, said adhesive-repellent coating being applied in the form of a solvent-containing mixture consisting essentially of an organic solvent, 44 to 84 parts by wt. of (a) a non-reactive, organic solvent-soluble, linear polyurethane resin or (b) a polyurethane resin containing hydroxypolyester groups having a hydroxyl content of about 0.1%,
1 to 16 parts by wt. of an aliphatic trifunctional isocyanate containing terminal isocyanate groups,
1 to 14 parts by wt. of glycerin,
0 to 40 parts by wt. of a micro-fine siliceous matting agent,
0 to 1 part by wt. of an organic tin ester catalyst, comprising the steps of applying a thin layer of said solvent-containing mixture on a support, drying said support, heating said support whereby said adhesive-repellent coating is formed by the reaction of the components of said solvent-containing mixture.

11. A process according to claim 10 wherein the polyurethane resin contains hydroxypolyester groups has a mean molecular weight of 150,000 to 200,000.

12. A process according to claim 10 wherein the trifunctional isocyanate is the biuret of hexamethylene diisocyanate.

13. A process according to claim 10 wherein the aliphatic trifunctional isocyanate has an isocyanate content of about 17%.

14. A process according to claim 10 wherein the matting agent consists of approximately equal parts of highly dispersed silicon dioxide and talc having a particle size of 0.1–15 microns.

15. A process according to claim 10 wherein the matting agent consists of equal parts of silicon dioxide and magnesium silicate.

16. A process according to claim 10 wherein the heat treatment occurs at temperatures above 60° C. for 0.1–1 minute.

17. A process according to claim 10 wherein the heat treatment occurs at temperatures between 80° and 90° C. for 15 seconds.

18. A process according to claim 10, characterized in that polyvinyl chloride is used as support.

19. A process according to claim 10 wherein the self-adhesive materials are coated with highly adhesive acrylate adhesive compositions.

20. A process according to claim 10 wherein the organic solvent is at least one compound selected from the group consisting of esters, ketones, aromatics and alcohols.

* * * * *